(12) United States Patent
Welter

(10) Patent No.: US 7,926,864 B2
(45) Date of Patent: Apr. 19, 2011

(54) SLIDING PANEL/LATCHING-SPRING CAGE

(75) Inventor: Patrick Welter, Lachambre (FR)

(73) Assignee: Johnson Controls Technology Company, Holland, MI (US)

( * ) Notice: Subject to any disclaimer, the term of this patent is extended or adjusted under 35 U.S.C. 154(b) by 164 days.

(21) Appl. No.: 12/368,875

(22) Filed: Feb. 10, 2009

(65) Prior Publication Data

US 2009/0200828 A1    Aug. 13, 2009

(30) Foreign Application Priority Data

Aug. 11, 2006  (DE) .......................... 10 2006 037 855
Sep. 11, 2006  (DE) .......................... 10 2006 043 206
Aug. 10, 2007  (WO) ................. PCT/EP2007/007117

(51) Int. Cl.
*B60J 1/02* (2006.01)
(52) U.S. Cl. .................... 296/97.12; 296/97.9
(58) Field of Classification Search ................. 296/97.1, 296/97.9, 97.12, 97.13; 16/297, 321, 341, 16/342

See application file for complete search history.

(56) References Cited

U.S. PATENT DOCUMENTS 5,564,772 A    10/1996  Miller
2005/0225114 A1  10/2005  Davey et al.

FOREIGN PATENT DOCUMENTS

| DE | 1580850 A1 | 12/1970 |
| DE | 3402416 A1 | 7/1985 |
| DE | 4234760 A1 | 4/1994 |
| DE | 19722259 C1 | 12/1998 |
| EP | 0231440 A2 | 8/1987 |

OTHER PUBLICATIONS

International Preliminary Examination Report (Aug. 10, 2007)—Written Opinion (2007).
German Examination Report Mar. 13, 2007).

*Primary Examiner* — Lori L Lyjak
(74) *Attorney, Agent, or Firm* — Fletcher Yoder P.C.

(57) ABSTRACT

A sun visor, such as for a vehicle, includes a spindle about which the sun visor may be pivoted and along which the sun visor may be displaced longitudinally. The spindle has a flattened portion. A latching-spring cage has a first pressure means. A tube receives a displaceable slide, while the slide receives the latching-spring cage, which in turn receives the spindle. A braking moment with regard to longitudinal displacement of the sun visor along the spindle is provided by second pressure means.

11 Claims, 6 Drawing Sheets

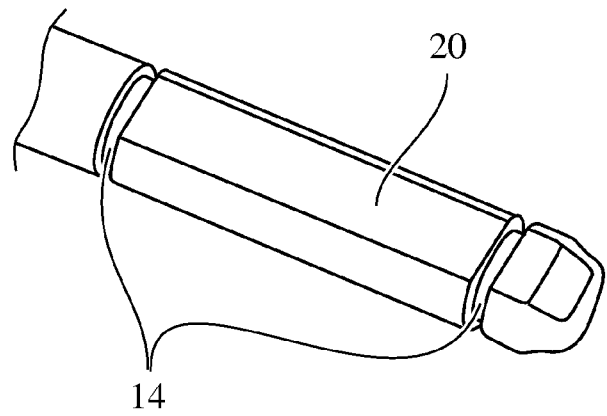
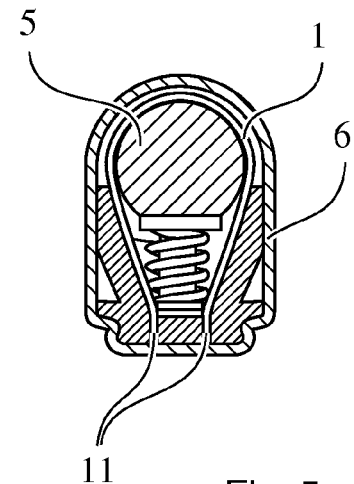
Fig. 4    Fig. 5
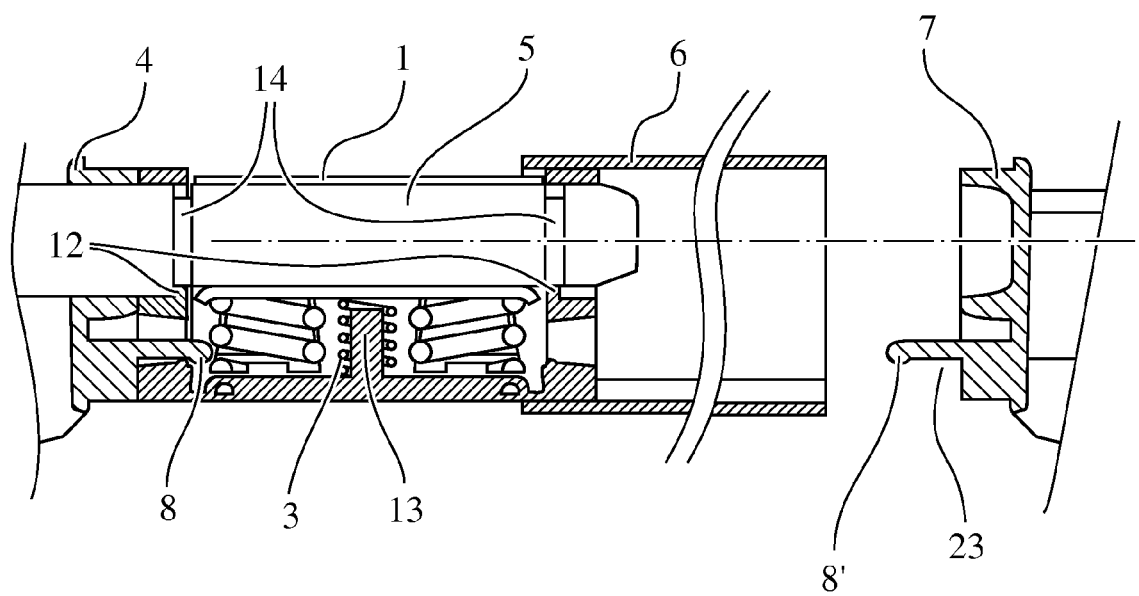
Fig. 6

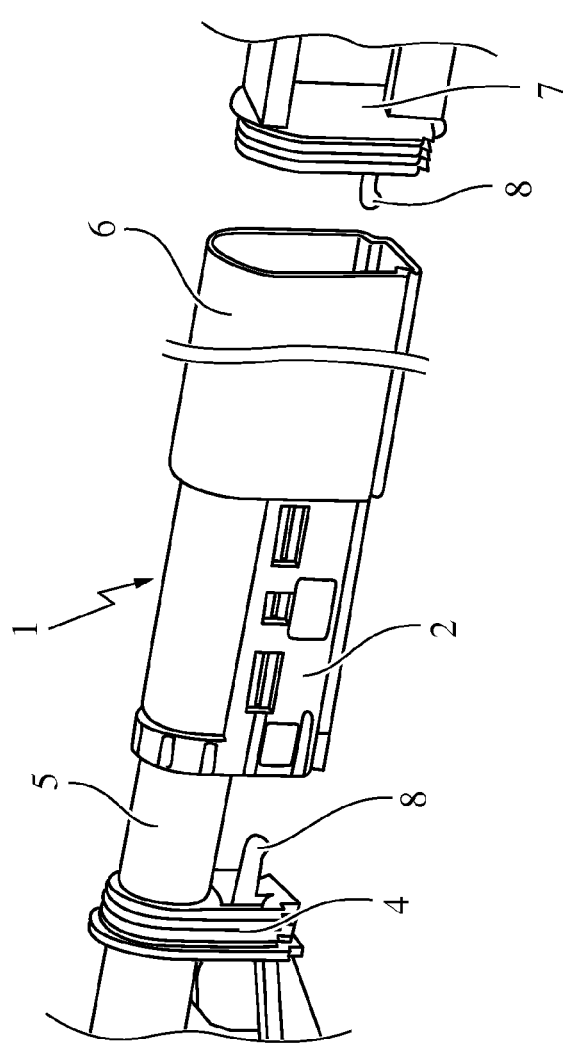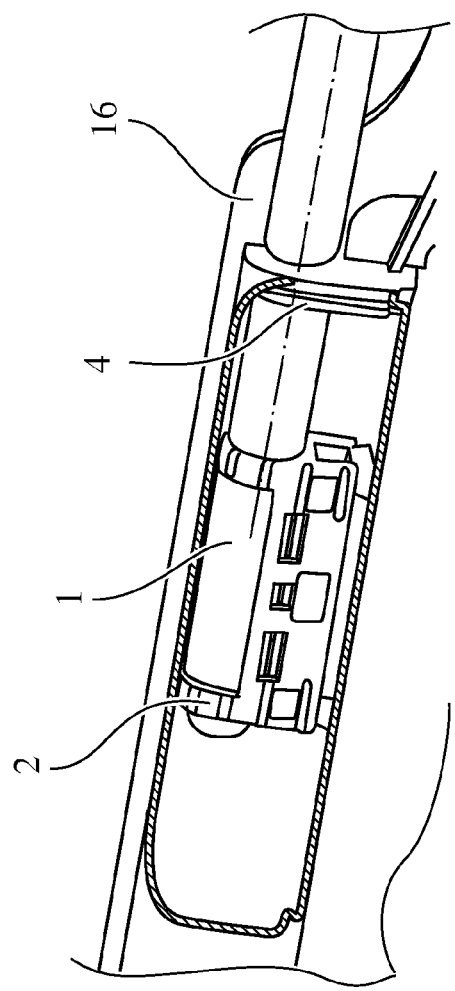

SLIDING PANEL/LATCHING-SPRING CAGE

CROSS REFERENCE TO RELATED APPLICATIONS

This application claims priority from and the benefit of PCT Application No. PCT/EP2007/007117, filed on Aug. 10, 2007; and German Patent No. DE 10 2006 037 855.5, filed on Aug. 11, 2006; and German Patent DE 10 2006 043 206.1, filed on Sep. 11, 2006; all entitled "Sliding Panel/Latching-Spring Cage", which are herein incorporated by reference.

BACKGROUND

The invention relates to a sun visor, in particular for a vehicle, the sun visor comprising a sun visor spindle having a flattened portion, a latching-spring cage, a displacement slide and a tube, the tube receiving the displacement slide, the displacement slide receiving the latching-spring cage and the latching-spring cage receiving the sun visor spindle.

Such sun visors are generally known. For example, the German printed patent specification DE 4104032 C1 discloses a sun visor comprising a sun visor body which is arranged on a spindle. The spindle is located in a manner which is rotationally movable but undisplaceable in a sliding body which is mounted in an unrotatable but displaceable manner by a tubular hollow body embedded in the sun visor body. In this connection, it is provided that the sliding body comprises a hollow space, in which an elongate metal cage intended for receiving the spindle is provided, the metal cage bearing a contact pressure element acting against the spindle, spring means being arranged between the base of the metal cage and the contact pressure element in order to press the contact pressure element against the spindle and thus the spindle against the top wall of the metal cage which is rounded according to the radius of the spindle.

A drawback with this sun visor is that for the displacement of the sun visor body in the longitudinal direction no braking moment is provided for fixing the sun visor body, which only becomes effective by tilting the visor body into the position of use. Instead, the sliding body comprises a contact pressure element which continuously generates a braking moment and which counteracts the sliding spring responsible for the sliding motion.

The object of the invention, therefore, is to provide a sun visor, in particular for a vehicle, which may be both tilted from the resting position into the position of use and displaced in the longitudinal direction and during the tilting motion and also during longitudinal displacement provides the possibility of fixing the sun visor, without having to overcome a continuous resistance during longitudinal displacement.

SUMMARY

This object is achieved according to the invention by a sun visor, in particular for a vehicle, the sun visor being arranged in a manner such that it may be pivoted about a sun visor spindle and it may be displaced longitudinally along the sun visor spindle, the sun visor spindle having a flattened portion, the sun visor having a latching-spring cage, the latching-spring cage having a first pressure means, the sun visor having a displacement slide, the sun visor having a tube, the tube receiving the displacement slide, the displacement slide receiving the latching-spring cage, the latching-spring cage receiving the sun visor spindle, the production of a braking moment with regard to a longitudinal displacement of the sun visor along the sun visor spindle being provided by means of a second pressure means. As a result, according to the invention it is advantageously possible that the longitudinal displacement of the sun visor takes place along the sun visor spindle without overcoming a braking moment, but it is nevertheless possible to fix the sun visor during longitudinal displacement by an additional second pressure means which is located in the displacement slide. Moreover, with such a construction, premounting is only required on one side and the construction is characterized by lower weight, a more compact design and fewer individual parts relative to the background art.

According to the invention, it is preferred that the latching-spring cage comprises a sliding plate and a U-shaped housing, whereby in combination with the first pressure means and the sun visor spindle, when adjusting the sun visor into the position of use, the sun visor spindle with its non-flattened side presses the sliding plate and the second pressure means, whereby a braking moment is generated. By the term "pressure means" is understood within the meaning of the invention any device for transmitting and/or storing force. Generally, sun visors are able to be adjusted between a setting substantially parallel to the vehicle roof (resting position) and a setting at least approximately at right angles to the vehicle roof (position of use) in a vehicle. If the sun visor is in the resting position, the sun visor spindle is supported with the flattened side on the sliding plate and accordingly generates less pressure on the sliding plate or the first and second pressure means located thereunder. As a result, the braking moment produced which is generated by the second pressure means is lower. Within the meaning of the invention, the first pressure means in the latching-spring cage could, for example, be a spring means. Particularly preferably, the spring means is a helical compression spring. More particularly preferably, the first pressure means is designed as two helical compression springs.

Preferably, the latching-spring cage is constructed such that the first pressure means may be directly supported on the side remote from the sun visor spindle. To this end, the latching-spring cage preferably comprises a U-shaped housing which tapers toward the side remote from the sun visor spindle, and comprises recesses and raised portions. During the production of the latching-spring cage, initially the U-shaped housing is widened and a sliding plate, as well as the first pressure means, inserted. Subsequently, the first pressure means is compressed and the U-shaped housing is transferred back into its initial position. After transferring the pressure means into its initial position, the first pressure means is supported on the recesses of the U-shaped housing. A widening of the U-shaped housing by the compressive force of the first pressure means is in this case prevented by the raised portions of the U-shaped housing. By the tapering of the U-shaped housing, it is particularly advantageously possible that no further component has to be installed in the latching-spring cage, so that the first pressure means remains on the side in the latching-spring cage remote from the sun visor spindle. According to the invention, it is preferable if the U-shaped housing comprises a recess and a raised portion, whereby the first pressure means may be supported in the U-shaped housing on the recess, and the U-shaped housing may engage in the first pressure means by means of the raised portion and, as a result, when placed under load by the first pressure means, an undesired spreading apart of the U-shaped housing is prevented.

According to the invention, it is preferable that the sliding plate comprises material projections, whereby the sliding plate may be inserted in a manner which is fixed against displacement into the tapering U-shaped housing, and a displacement being able to be prevented even under compression loading. For example, the sliding plate may comprise three such material projections.

Within the meaning of the invention it is preferable that the displacement slide comprises two first grooves, whereby the base of the displacement slide may be moved to a certain extent in the direction of the tube and the second pressure means may act in the displacement slide on the tube. With the displacement of the sun visor into the position of use, the sun visor spindle generates on the sliding plate a force which leads to the deformation of the second pressure means located thereunder in the displacement slide. The second pressure means transfers the force acting thereon and by the deformation of the displacement slide base, a bulged portion is produced between the first grooves of the displacement slide in the direction of the tube. As a result, a braking moment is generated, which prevents an undesired longitudinal displacement of the sun visor spindle. Within the meaning of the invention, in this case the second pressure means may also be a spring means, for example.

It is preferable, moreover, that the displacement slide comprises at least one web and the sun visor spindle comprises at least one second groove whereby, after inserting the sun visor spindle into the latching-spring cage which is received by the displacement slide, the sun visor spindle is fixed against longitudinal displacement by engaging the second groove of the sun visor spindle in the web of the displacement slide. Within the meaning of the invention, for example, a plurality of webs may also be used for engagement and the sun visor spindle may comprise a plurality of second grooves, for example of the round type.

It is further preferably provided that at the end of the tube one respective plug is present which comprises a tongue and an undercut, whereby an engagement of the sun visor spindle is effected in the extended and retracted position and thus the longitudinal displacement of the sun visor is limited. By means of the tongue and the undercut, the displacement slide may engage with the plugs and thus the longitudinal motion may be stopped.

DRAWINGS

Embodiments of the invention are shown in the drawings and described in more detail in the following description.

FIG. 4 shows schematically the flattened part of the sun visor spindle, the sun visor spindle comprising in this view two second grooves.

FIG. 5 shows schematically a cross section of a tube which receives the displacement slide, which in turn receives the latching-spring cage, which in turn receives the sun visor spindle.

FIG. 6 shows schematically a longitudinal section of the tube with the displacement slide, latching-spring cage, sun visor spindle, a plug.

FIG. 7 shows schematically the arrangement of the plug in the tube, the displacement element with the latching-spring cage and the sun visor spindle in the tube.

FIG. 8 shows the device on the sun visor, for the tilting and longitudinal displacement of the sun visor.

DETAILED DESCRIPTION

Figure 1:
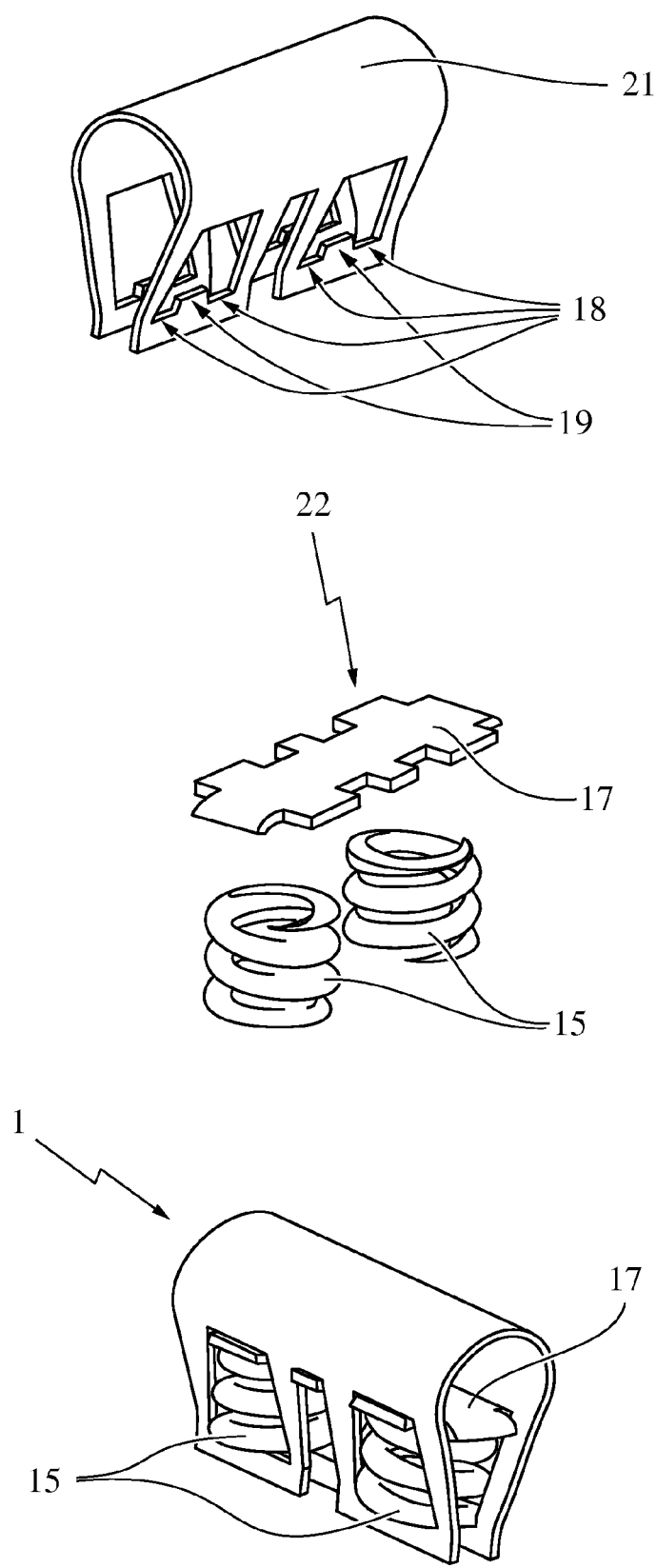
FIG. 1 shows schematically in the upper part and in an exploded view components which, in the assembled state, form a latching-spring cage in the lower part.

In FIG. 1 an exploded view is shown schematically in the upper part of the drawing, in which a U-shaped and tapered housing 21 (i.e. with limbs approaching one another) of a latching-spring cage 1 is shown with recesses 18 and raised portions 19 of the housing. Moreover, a sliding plate 17 with material projections 22, and a first pressure means 15 for the latching-spring cage are shown. In the embodiment shown here, the first pressure means 15 is a spring means. In the lower part of the drawing the entire latching-spring cage 1 is shown with individual components, the U-shaped tapered housing 21 (referred to below simply as the U-shaped housing) initially being widened for assembly (i.e. the limbs of the U-shaped housing extend substantially parallel), receiving the sliding plate 17 and subsequently receiving the first pressure means 15. The first pressure means 15 (in this case a spring means) is subsequently compressed and the U-shaped housing 21 moved back again into its original shape. The first pressure means 15 is decompressed until the first pressure means 15 is in contact with the recesses 18 of the U-shaped housing 21. At the same time, the first pressure means 15 is supported on its side remote from the sun visor spindle 5 directly on the latching-spring cage 1.

Figure 2:
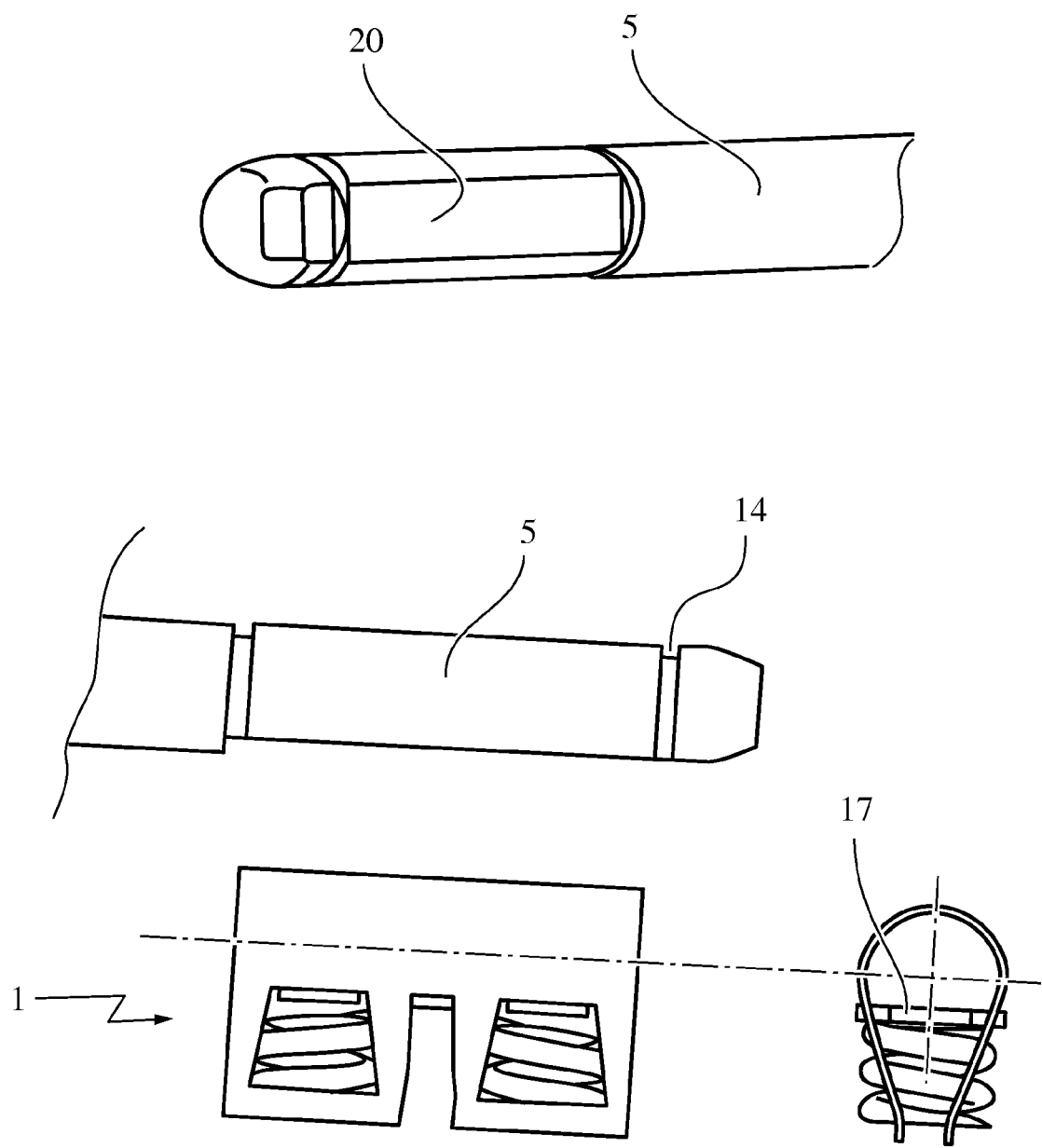
FIG. 2 shows schematically a sun visor spindle and the latching-spring cage with its various components in various side views.

FIG. 2 shows schematically the flattened portion 20 on the sun visor spindle 5 and the second grooves 14 located in the sun visor spindle 5 for engagement in the displacement slide 2 (not shown). In the lower part of the figure, two side views of the latching-spring cage 1 are shown.

Figure 3:
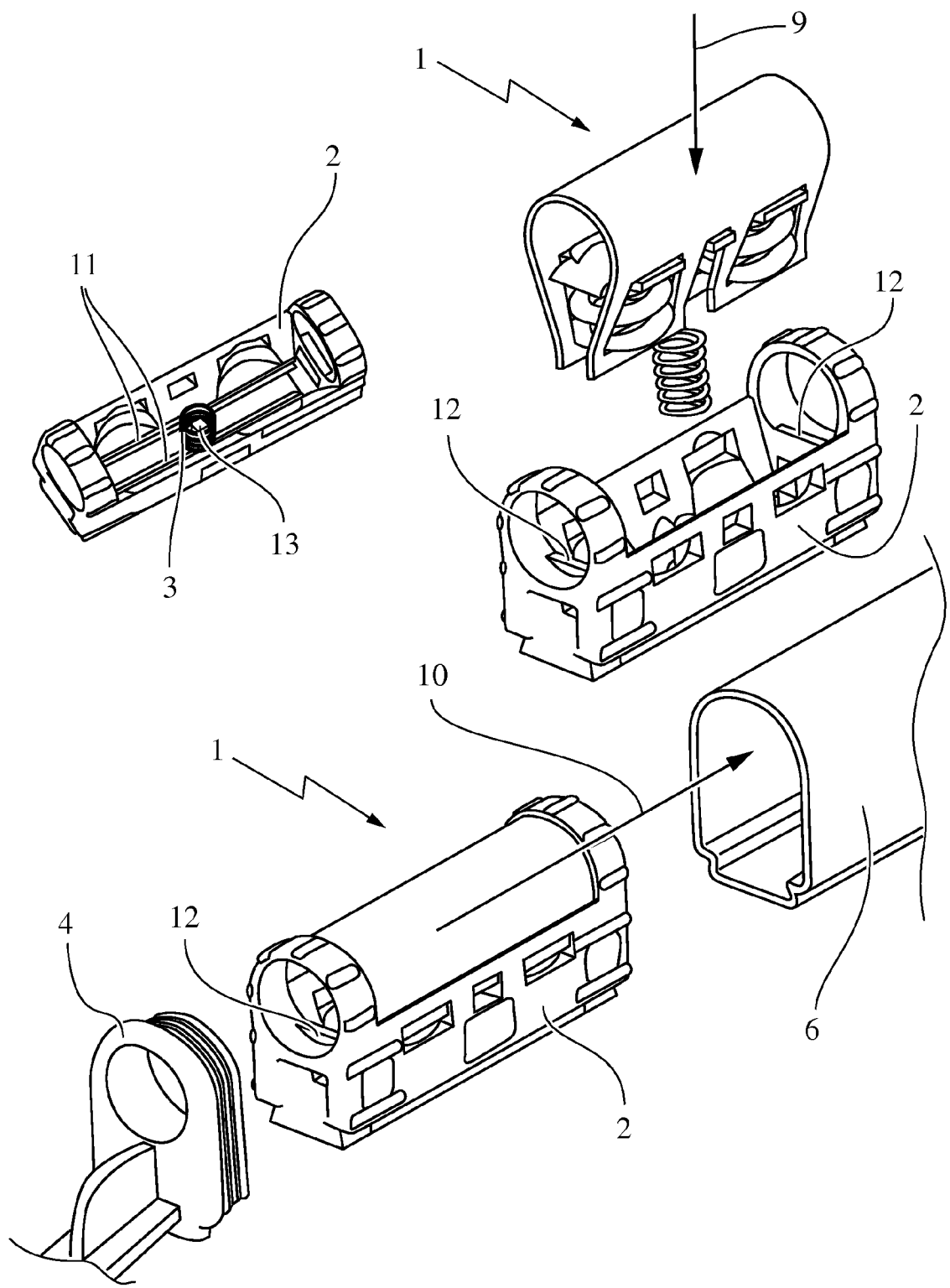
FIG. 3 shows schematically how the latching-spring cage comprising an additional second pressure means is inserted into a displacement slide and how the displacement slide, which has received the latching-spring cage, is inserted into a tube.

In FIG. 3, the installation of the latching-spring cage 1 in the displacement slide 2 in one direction 9 and the installation of the displacement slide 2 containing the latching-spring cage 1 in the tube 6 are shown schematically. In the embodiment, the displacement slide 2 as second pressure means 3 comprising a spring means, two first grooves 11 and two webs 12. The displacement slide 2 additionally comprises the storage point 13 for the second pressure means 3. Also shown is the plug 4 which—together with the displacement slide 2 and the latching-spring cage 1 located therein—is pushed into the tube 6 in the direction 10.

FIG. 4 shows schematically a flattened portion 20 of the sun visor spindle 5 with two second grooves 14, the second grooves 14 having been selected for this embodiment being two in number.

FIG. 5 shows schematically a cross section in which the tube 6, the latching-spring cage 1, the sun visor spindle 5 and the first grooves 11 in the displacement slide 2 are shown. In the embodiment, two first grooves 11 being provided in the displacement slide 2.

In FIG. 6 the cross section is shown schematically through the tube 6, the two plugs 4 and 7 being shown with their undercut 23 and the tongue 8 as well as the sun visor spindle 5 with its two grooves 14. Moreover, the latching-spring cage 1, the displacement slide 2, the second pressure means 3 of the displacement slide 2 as well as the tube 6 are shown. The storage point 13 for the second pressure means 3 is also shown in FIG. 6.

FIG. 7 shows schematically the sun visor spindle 5 which has been received in the latching-spring cage 1, the latching-spring cage 1, in turn, having been received by the displacement slide 2. Moreover, the tube 6 and the two plugs 4 and 7 are shown with the tongues 8 for the engagement of the displacement slide 2.

FIG. 8 shows schematically how the sun visor 16 receives the components of FIG. 7, in this case the displacement slide 2, the latching-spring cage 1 and the plug 4 being visible.

Figure 9:
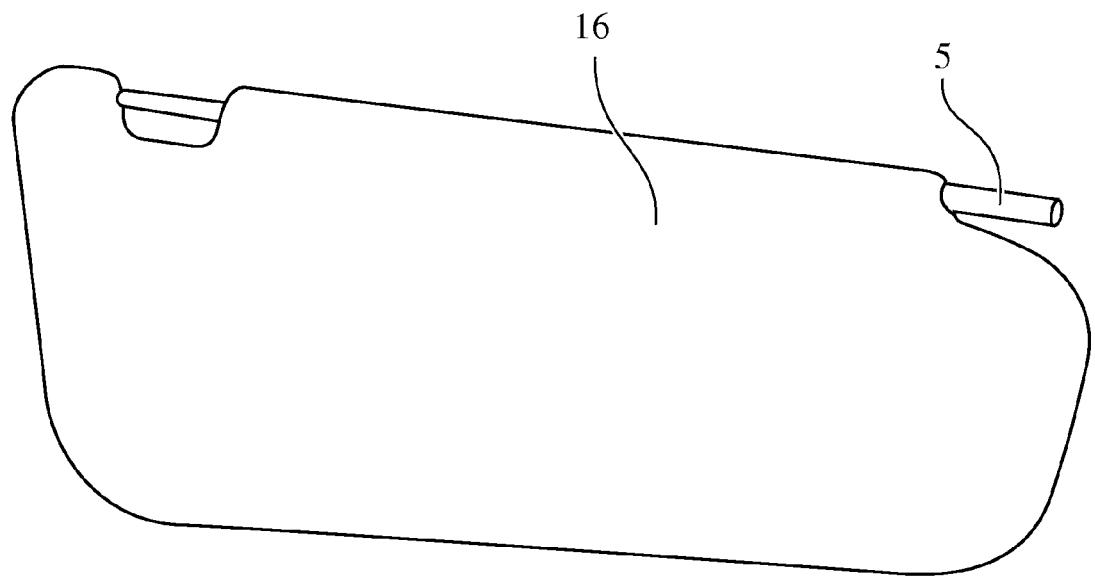
FIG. 9 and FIG. 10 show the sun visor with the sun visor spindle in a state which is cut open and a state which is not cut open.

FIG. 9 shows schematically the sun visor 16 and the sun visor spindle 5.

Figure 10:
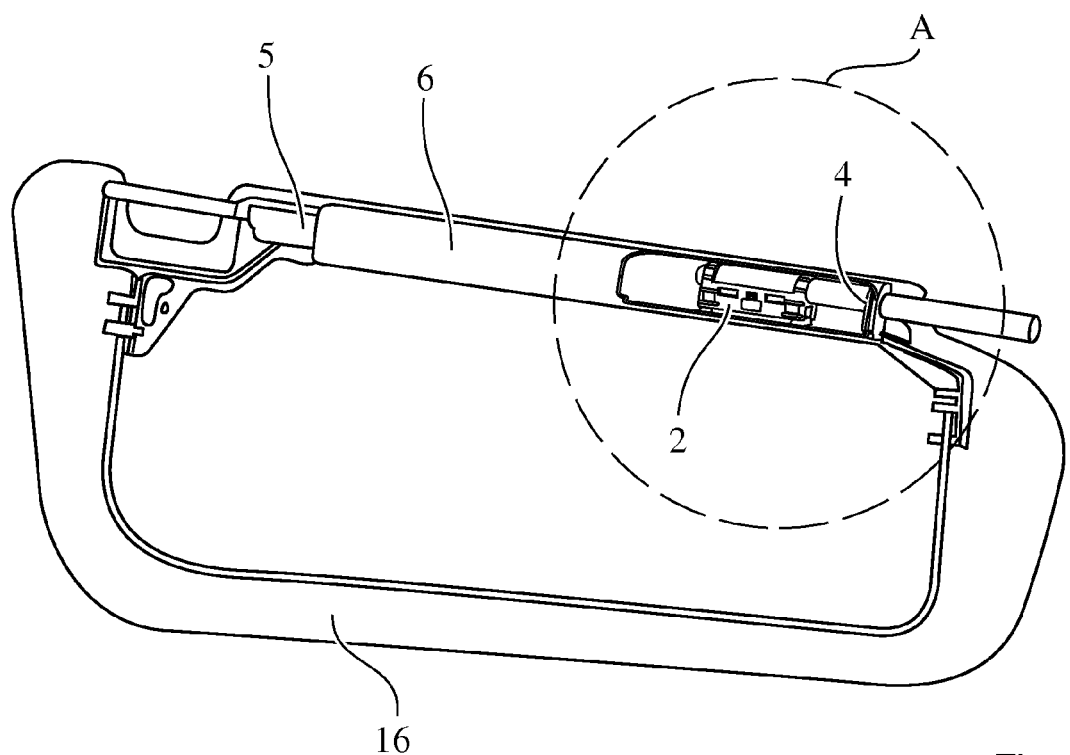

In FIG. 10 the sun visor spindle 5 in the tube 6 and the sun visor 16 are shown, the displacement slide 2 and a plug 4 being able to be seen in the detail A.

The invention claimed is:

1. A sun visor, in particular for a vehicle, comprising:
   a sun visor spindle, the sun visor being arranged in a manner such that it may be pivoted about the sun visor spindle and it may be displaced longitudinally along the sun visor spindle, the sun visor spindle comprising a flattened portion;
   a latching-spring cage, the latching-spring cage comprising a first pressure means, a sliding plate and a U-shaped housing;
   a displacement slide; and
   a tube;
   wherein the tube receives the displacement slide, the displacement slide receives the latching-spring cage, and the latching-spring cage receives the sun visor spindle;
   wherein the first pressure means is directly supported on a side of the latching-spring cage remote from the sun visor spindle, and a cross section of the latching spring cage tapers at a side remote from the sun visor spindle; and
   wherein a braking moment with regard to a longitudinal displacement of the sun visor along the sun visor spindle is provided by a second pressure means.

2. The sun visor as claimed in claim 1, wherein the first pressure means includes a helical compression spring.

3. The sun visor as claimed in claim 1, wherein the first pressure means includes as two helical compression springs.

4. The sun visor as claimed in claim 1, wherein the U-shaped housing of the latching-spring cage comprises recesses and raised portions.

5. The sun visor as claimed in claim 1, wherein the sliding plate comprises material projections.

6. The sun visor as claimed in claim 1, wherein the first pressure means or the second pressure means includes a spring.

7. The sun visor as claimed in claim 1, wherein the displacement slide comprises two first grooves.

8. The sun visor as claimed in claim 7, wherein the displacement slide comprises at least one web.

9. The sun visor as claimed in claim 8, herein the sun visor spindle comprises at least one second groove.

10. The sun visor as claimed in claim 1, wherein the sun visor comprises two plugs.

11. The sun visor as claimed in claim 10, wherein the plugs comprise a tongue and an undercut.

\* \* \* \* \*